United States Patent
Bostwick

(10) Patent No.: US 6,435,828 B1
(45) Date of Patent: Aug. 20, 2002

(54) SPLIT BLADE RADIAL FAN

(75) Inventor: Peter K. Bostwick, Maryland Heights, MO (US)

(73) Assignee: Emerson Electric Co., St. Louis, MO (US)

( * ) Notice: Subject to any disclaimer, the term of this patent is extended or adjusted under 35 U.S.C. 154(b) by 0 days.

(21) Appl. No.: 09/759,966

(22) Filed: Jan. 12, 2001

(51) Int. Cl.$^7$ .............................................. F04D 29/30
(52) U.S. Cl. ...................... 416/175; 416/183; 416/185; 416/189; 416/203
(58) Field of Search ................................ 416/183, 185, 416/189, 175, 203, 228

(56) References Cited

U.S. PATENT DOCUMENTS

| | | | |
|---|---|---|---|
| 1,926,225 A | * 9/1933 | Birmann | .................. 416/90 R |
| 2,654,529 A | 10/1953 | Smith | |
| 2,859,933 A | * 11/1958 | Whitaker | .................... 416/183 |
| 3,730,642 A | 5/1973 | Barnstead et al. | |
| 4,060,337 A | * 11/1977 | Bell, III | ................. 416/186 R |
| 4,093,401 A | * 6/1978 | Gravelle | ...................... 416/185 |
| 4,167,369 A | * 9/1979 | Ishihara | ...................... 416/185 |
| 4,236,443 A | 12/1980 | Schossow | |
| 5,060,720 A | 10/1991 | Wollaber et al. | |
| 5,375,651 A | 12/1994 | Colwell | |
| 5,478,275 A | 12/1995 | Malm | |
| 5,814,908 A | 9/1998 | Muszynski | |

\* cited by examiner

*Primary Examiner*—Edward K. Look
*Assistant Examiner*—Ninh Nguyen
(74) *Attorney, Agent, or Firm*—Thompson Coburn LLP

(57) ABSTRACT

A fan has a plurality of blades that are each configured to induce radial-flow adjacent the trailing edge of the blade while also being configured to induce both radial-flow and axial-flow near the base end of the blade. This is achieved by splitting each of the blades into two sections and orienting the chord-line of the blades near the hub of the fan at angle relative to the axis of the hub while maintaining the chord-line of the blades parallel to the axis near the trailing edges of the blades. This results in an increased ability of the fan to draw air in axially as compared to conventional radial-flow fans. The fan of the preferred embodiment also makes use of an annular ring joining the trailing edges of the blades. The ring has axially opposite sides that taper toward one another as the ring extends radially inward and acts as a diverter to channel air to axially opposite sides of an annular obstruction in the flow path of air being exhausted from the fan, thereby further increasing the fan's efficiency.

30 Claims, 5 Drawing Sheets

SPLIT BLADE RADIAL FAN

BACKGROUND OF THE INVENTION (1) Field of the Invention

This invention pertains to the field of fans of the type mounted on shafts of electric motors and other dynamoelectric devices for cooling such devices during operation. More particularly, this invention pertains to a radial or centrifugal fan wherein the outer portion of its blades are configured to induce radial-flow on air expelled by the fan, and wherein the central portion of the fan's blades are configured to induce partial axial-flow and partial radial-flow to improve the intake of air into the fan from one of the fan's axially opposite sides. Additionally, the fan of the preferred embodiment has an annular wedge shaped ring connecting the trailing edges of the fan's blades that acts as a diverter to channel air exiting the fan to opposite axial sides of an annular grill bar on a cover that encloses the fan. The configuration of the fan of the invention improves efficiency of the fan without increasing its size, thereby providing greater cooling capacity over conventional radial fans of the same size.

(2) Description of the Related Art

Many dynamoelectric devices such as appliance motors, hand tool motors, generators, and alternators utilize fans mounted on their rotor shafts to provide for air cooling of stator and rotor windings of the devices during their operation. Typically such fans are mounted at an axial end of the dynamoelectric devices immediately adjacent the device housing and are configured to pull or push air through the housing and between the rotor and stator.

The majority of dynamoelectric devices are generally cylindrical in shape and the fans are commonly configured to have nearly the same diameter. It is also common for such devices to have a cover enclosing the fan, or to place the fan within the housing of the devices, to prevent objects from contacting the fan blades. Additionally, it is generally desirable to configure cooling fans in a manner such that they take only a minimum of space, since such cooling fans must generally fit within a specific cylindrical space of minimal axial length.

Although some machines in which dynamoelectric devices operate allow for the use of axial-flow fans, the configurations of many machines in which dynamoelectric devices are used often necessitate the use of radial-flow fans which discharge air radially outward. Radial-flow fans are designed to obtain maximum air flow rates for a given configuration, unlike centrifugal compressors which are often designed to obtain large pressure differentials under low flow rate conditions. Other design considerations include costs and whether the fan must operate in opposite directions of rotation.

Perhaps the simplest radial-flow fan design is a straight blade fan. Straight blade fans utilize a plurality of blades extending radially from a central hub. Like other fan designs, the hub of a straight blade fan is typically a generally cylindrical body having a through-hole aligned with its center axis for mounting the fan to the shaft of a dynamoelectric device. It is also common for the through-hole to be keyed with the shaft to insure that the fan rotates with the shaft without slippage. The blades of a straight blade fan are typically flat rectangular members oriented parallel to the center axis of the hub such that air is forced through the fan purely by centrifugal force. Thus, straight blade fans are typically symmetric about a plane that is perpendicular to the center axis of the hub and act to draw air inward from both of the opposite axial sides of the fan in response to the fan blades pushing air radially outward from the center hub.

To reduce the amount of air drawn into a radial fan from the side of the fan that faces away from the dynamoelectric device to be cooled, such radial fans often have an imperforate disk shaped backing mounted for rotation with the fan on the side of the fan farthest from the housing of the dynamoelectric device. Such backings generally increase the amount of air drawn into the fan from the side of the fan facing the housing of the dynamoelectric device. However, such backings take up axial space and thereby reduce the axial width of the fan blades for a given total axial length of the fan, thereby decreasing the total output of the fans compared to non-backed fans of equal axial length. Additionally, backings also increase the amount of material required to manufacture such fans.

A preferred method of reducing the amount of air drawn into a radial fan from the side of the fan that faces away from the dynamoelectric device is to configure the cover which typically surrounds the fan with an imperforate disk shaped end that is positioned with an axial gap between it and the fan. Thus, the disk shaped end of the cover acts much as a backing does to increase the amount of air drawn into the fan from the side of the fan facing the housing of the dynamoelectric device, without reducing the axial width of the fan blades.

Straight blade radial fans have an advantage of operating equally well in either direction of rotation. For this reason, straight blade radial fans are often used to cool dynamoelectric devices whose shafts rotate in opposite directions during operation. However, for those devices whose shafts seldom or never rotate in opposite directions, straight blade fans need not be used and other configurations having blades that curve in a plane perpendicular to the center axis of the fan hub have been used. By curving the blades of a radial fan in a direction opposite that of the rotation (commonly called a backward curved radial fan), the fan exhausts air using both centrifugal force and force caused by the blade pushing the air in partially the radial direction. However, such curved blades may or may not increase the overall air output, since curving the blades also reduces the circumferential velocity of the air passing through the fan and thereby decreasess the centrifugal force component generated by the fan. Generally, straight blade radial fans produce a greater air flow rate than backward curved blade fans of the same size and are thus desirable for use with most dynamoelectric devices.

Although radial-flow fans have proven effective for cooling dynamoelectric devices, it remains advantageous to design fans having ever greater efficiency. Furthermore, it is desirable to increase the efficiency of such fans without increasing the size of the fans and without significantly increasing the cost or adding additional components to the dynamoelectric device assembly.

SUMMARY OF THE INVENTION

The radial fan of the present invention increases the flow rate of cooling air through a dynamoelectric device as compared to prior art straight blade radial fans of the same size. The increased airflow is a result of the configuration of the blades of the fan as well as the configuration of an annular ring joining the blades.

In general, the fan of the preferred embodiment of the invention is a fan configured for use with a dynamoelectric device whose rotor shaft rotates in only one direction. The fan of the preferred embodiment is made more efficient by configuring the blades to perform as a conventional radial fan near their trailing edges while also configuring the blades to perform as a mixed-flow fan nearer the shaft or inlet. This is achieved by splitting each of the blades into two sections and orienting the chord-line of the blades near the hub at an angle relative to the axis of the hub while maintaining the chord-line of the blades near the trailing edges of the blades parallel to the hub axis. By configuring the blades as a mixed-flow fan near the hub of the fan, the fan more efficiently draws air from its axial side facing the dynamoelectric device. This results in a corresponding higher radial air flow rate from the fan and greater cooling of the dynamoelectric device.

The annular ring of the preferred embodiment of the fan also increases the flow rate from the fan by channeling the air into exhaust openings of the cover that circumferentially surrounds the fan. The cover used with the preferred embodiment of the fan has an annular grill bar which surrounds the blades of the fan and axially separates pairs of openings in the cover to prevent objects and fingers from contacting the blades of the fan when the fan is rotating. Thus, the grill bar of the cover partially obstructs the flow of air from the fan and the air must pass on either axial sides of the grill bar as it is being exhausted. The ring of the preferred embodiment has axially opposite sides that taper toward each other as they extend radially inward. As air flows past the ring while being exhausted, the taper of the ring axially separates the flow in a streamline manner, which then allows the air to pass the grill bar of the shroud more efficiently.

Like the preferred embodiment of the fan, an alternative embodiment of the fan has blades configured such that the chord-line of the blades near the hub are at an angle relative to the axis of the hub while the chord-line of the blades near the trailing edges of the blades are parallel to the hub axis. However, the disclosed alternative embodiment of the fan achieves this by extending a portion of the each of the blades, near the hub, axially forward of the remainder of the blade and curving such portions so that the portions are rotationally in advance of the remainder of the blades. Additionally, the alternative embodiment of the fan utilizes a ring positioned at the root edge of each of the blades that acts similar to a backing but that is absent where the chord-line of each blade is oriented at an angle relative to the axis of the hub. This allows the fan to be manufactured using simple molding methods that would not be possible if the fan had a disked shaped backing rather than a ring.

While the principle advantages and features of the invention have been described above, a more complete and thorough understanding of the invention may be attained by referring to the drawings and the detailed description of the preferred embodiment, which follow.

BRIEF DESCRIPTION OF THE DRAWINGS

References and characters in the written specification indicate corresponding parts throughout the several views of the drawings.

DETAILED DESCRIPTION OF THE INVENTION

Figure 1:
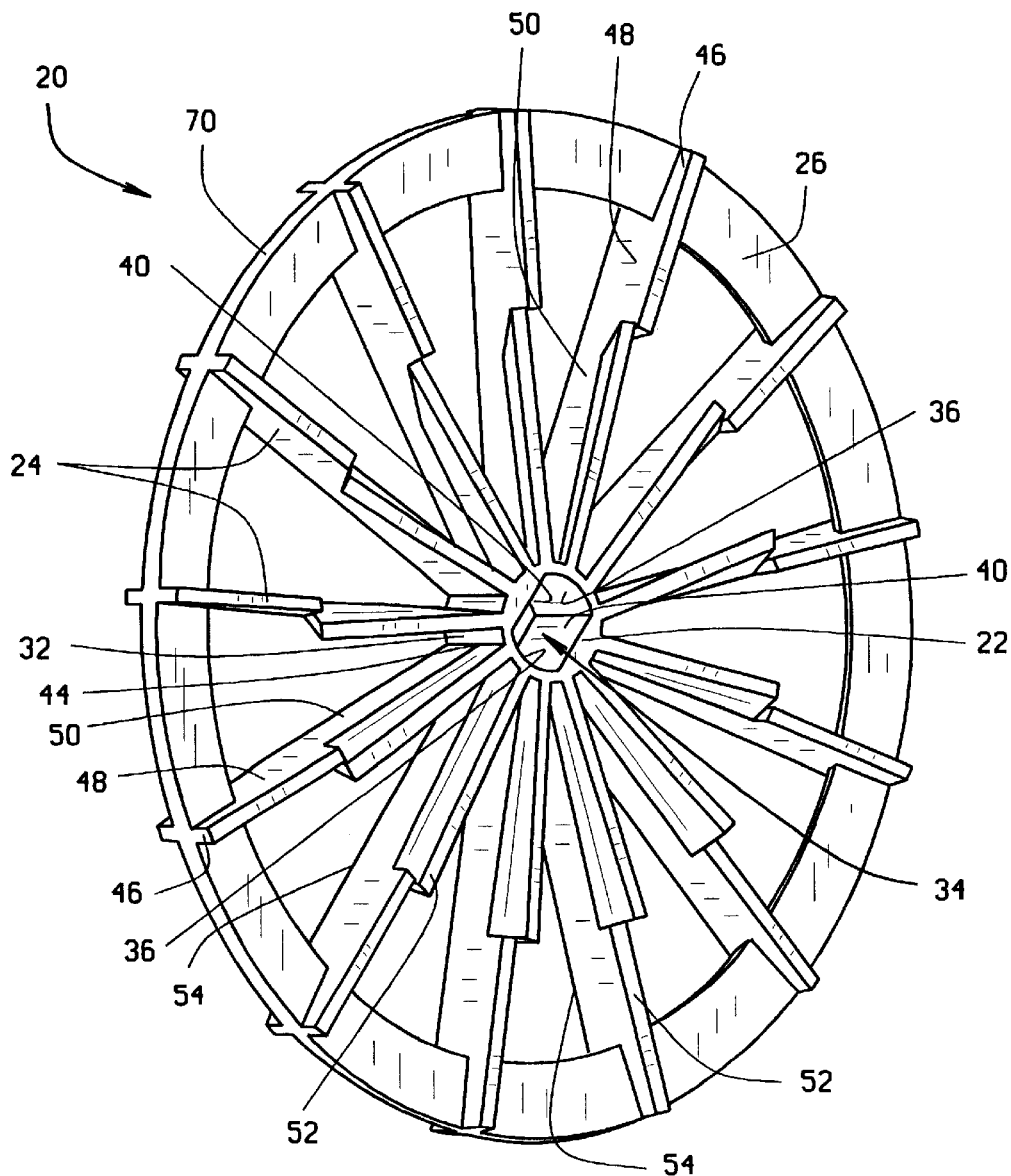
FIG. 1 is an isometric view of the fan of the preferred embodiment of the invention.
Figure 2:
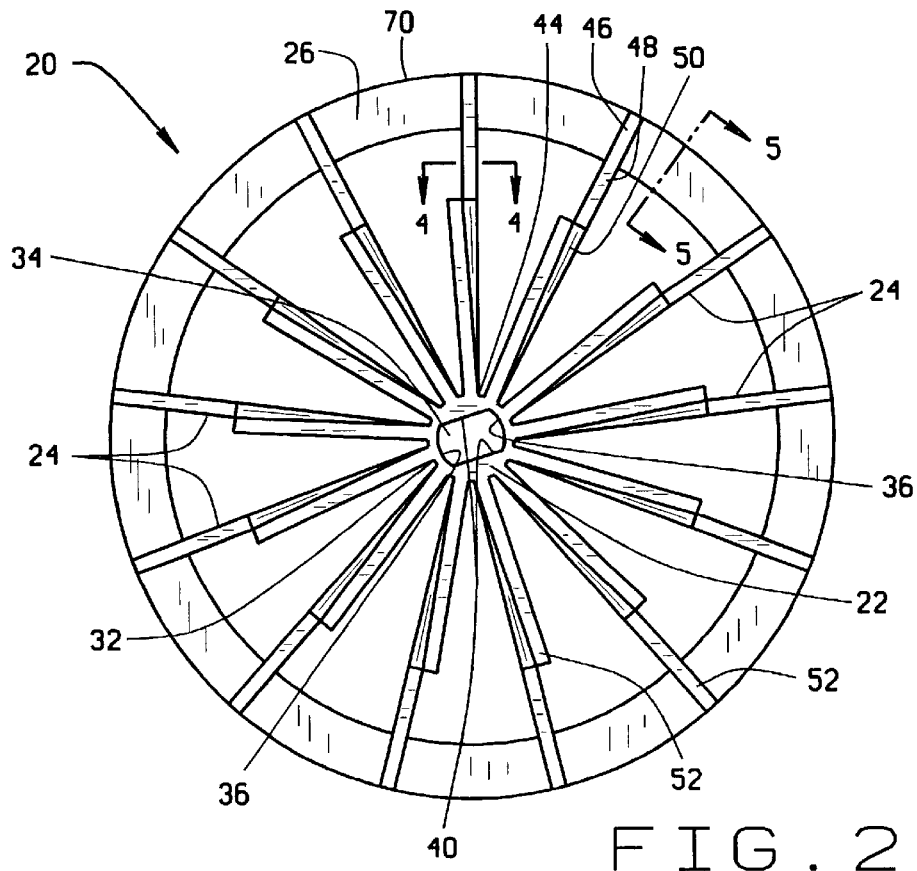
FIG. 2 is a plan view of the fan of the preferred embodiment of the invention as seen looking at the tip edges of the blades.
Figure 3:
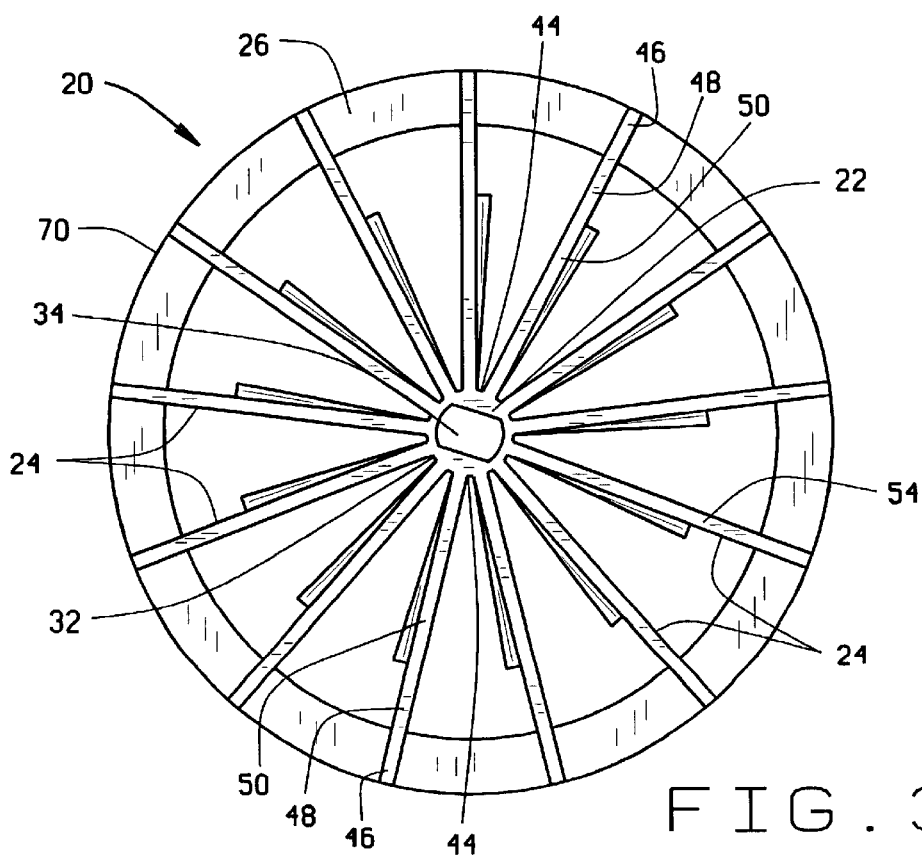
FIG. 3 is a plan view of the fan of the preferred embodiment of the invention as seen looking at the root edges of the blades.
Figure 6:
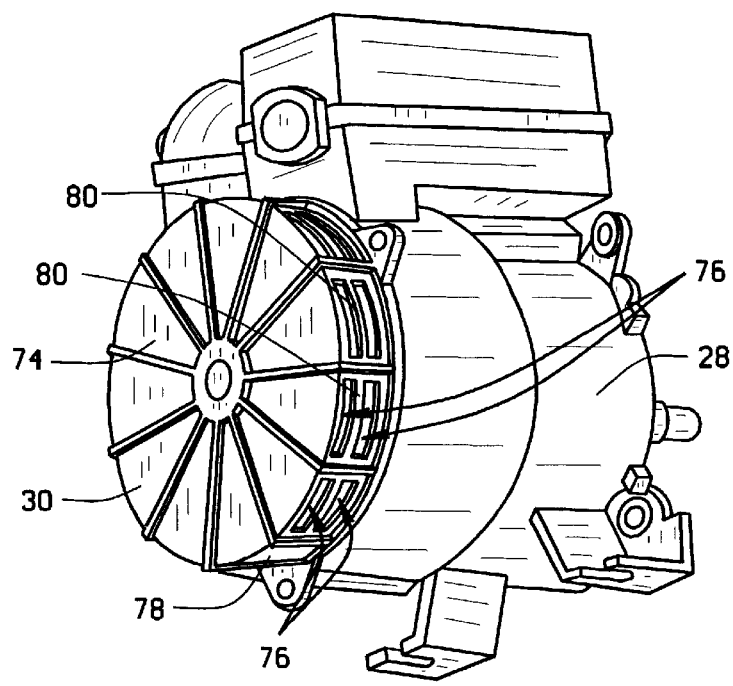
FIG. 6 is an assembly view of an electric motor of the type with which the fan of the preferred embodiment of the invention is configured for use.
Figure 7:
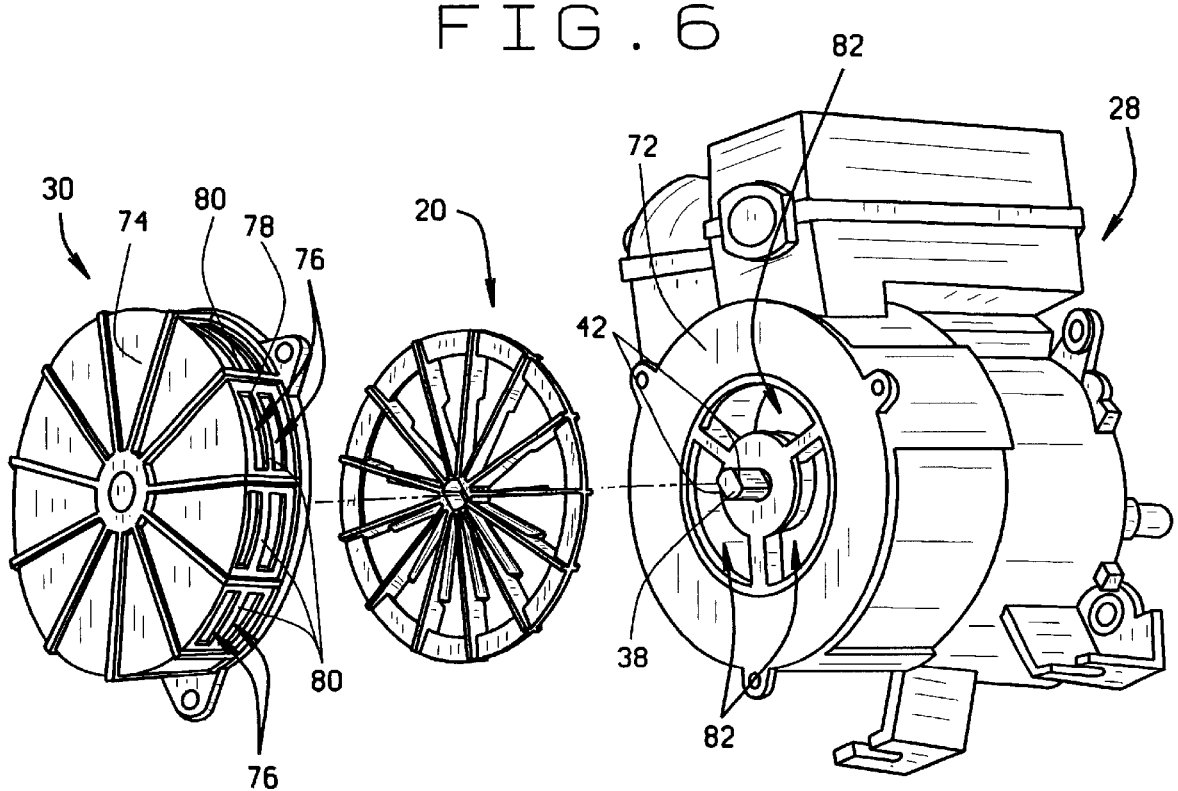
FIG. 7 is an exploded view of the assembly of FIG. 6 showing the placement of the fan of the preferred embodiment of the invention relative to the motor and the cover.
Figure 8:
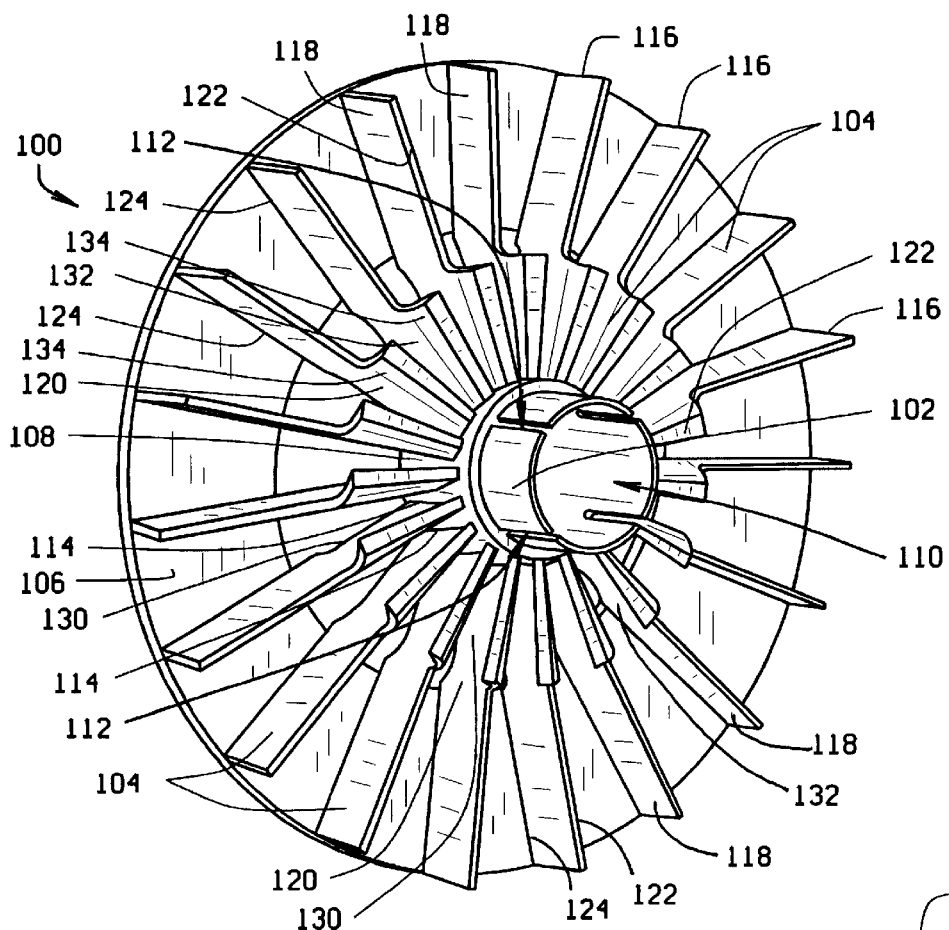
FIG. 8 is an isometric view of a fan of an alternative embodiment of the invention.
Figure 11:
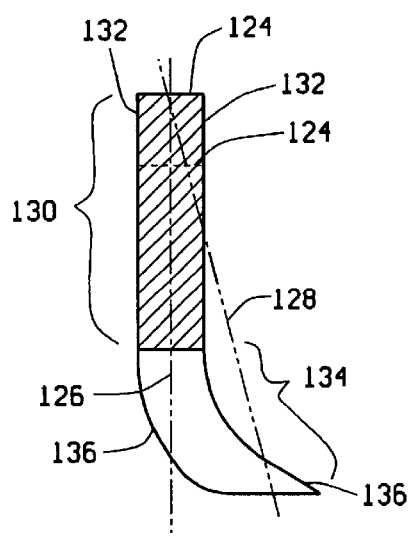
FIG. 11 is a cross-section of one of the blades of the fan of the alternative embodiment of the invention taken at the line 11—11 of FIG. 9.

The preferred embodiment of the fan 20 of the invention is shown in its entirety in FIGS. 1–3. The fan 20 preferably comprises a central hub 22, a plurality of blades 24, and an annular ring 26. The fan 20 of the preferred embodiment is configured to cool an electric motor 28 of the type having a rotor that rotates in only one direction and is enclosed by a cover 30 once it is assembled on the motor as shown in FIGS. 6 and 7. Additionally, the fan 20 is preferably formed of a polymeric resin as a single monolithic part.

The hub 22 of the preferred embodiment of the fan 20 is a generally cylindrical body having an outer periphal surface 32 and a center bore or opening 34 that extends through the hub 22 along its axis. The opening 34 of the hub 22 preferably has opposite arcuate surfaces 36 configured to slidably engage with the rotor shaft 38 of the motor 28, as shown in FIG. 7. An opposite pair of flats 40 separate the arcuate surfaces 36 of the opening 34 and are configured to engage with a pair of opposite notches 42 formed in the end of the rotor shaft 38 of the motor 28 to provide an interlocking fit between the hub 22 and the rotor shaft that ensures that the fan 20 rotates with the rotor shaft. However, it should be understood that numerous methods of attaching fans to shafts are known in the art and alternative configurations of the hub and rotor shaft and alternative methods of attaching one to the other could also be used.

The blades 24 of the preferred embodiment of the fan 20 of the invention are evenly spaced circumferentially about the axis of the hub 22. Each of the blades 24 has a base end 44 that is secured to the hub 22, and each extends radially from the hub to an opposite trailing edge 46. Additionally, each of the blades 24 has a first radial section 48 extending radially inward from its trailing edge 46 and each has a second section 50 extending radially outward from its base end 44.

Figure 4:
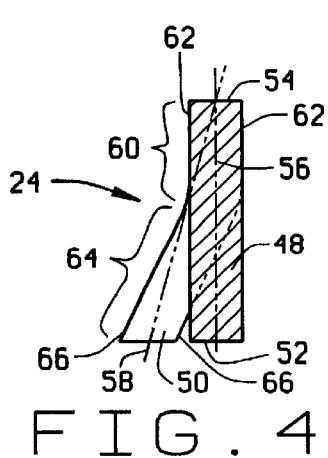
FIG. 4 is a cross-section of one of the blades of the fan of the preferred embodiment of the invention taken at the line 4—4 of FIG. 2.

The axial width or blade height of each of the blades 24, measured from the tip edge 52 of each of the blades to the root edge 54 of each of the blades, preferably remains constant between the blade's base end 44 and trailing edge 46. At any given radius from the axis of the hub 22, the first section 48 of each of the blades 24 has a cross-section that is generally rectangular with a chord-line 56, defined as an imaginary line extending from the tip edge 52 to the root edge 54 of the blade as shown in FIG. 4, that is oriented parallel to the axis of the hub.

Unlike the first section 48 of each of the blades 24, the second section 50 of each of the blades, at any given radius from the axis of the hub 22, has a cross-section that has its chord-line 58 oriented at an angle relative to the axis of the hub 22 such that the tip edge 52 is rotationally in advance of the root edge 54 as the fan 20 revolves with the rotor shaft 38. Additionally, the cross-section of the blade second section 50 consists of a first portion 60 having opposite straight parallel sides 62 that are oriented parallel to the axis of the hub 22 and a second portion 64, also having straight parallel sides 66, that intersects the first portion at an angle. As the second section 50 of each of the blades 24 extends radially outward from the axis of the hub 22, the angle between the parallel sides 62,66 of the first and second portions 60,64 increases from zero degrees at the base end 44 of each of the blades. Stated another way, the angle of the parallel sides 66 of the second portion 64 relative to the hub axis is zero degrees where the second portion joins the hub and progressively increases as the second portion 64 extends radially from the hub 22.

The first and second sections 48,50 of each of the blades 24 extend radially toward each other and terminate at a common point that lies between the base end 44 and the trailing edge 46 of each blade, causing an abrupt discontinuity in the tip edge 52 of each of the blades where the sections meet. However, the entire root edge 54 of each of the blades 24 extends radially straight.

Figure 5:
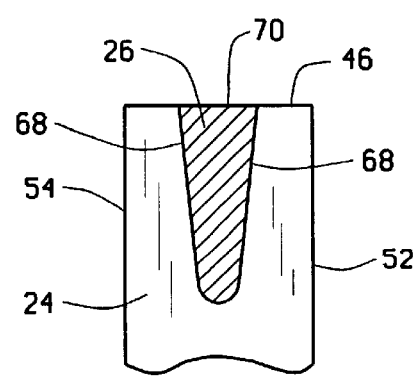
FIG. 5 is a partial cross-section of the ring of the fan of the preferred embodiment of the invention taken at the line 5—5 of FIG. 2.

The ring 26 of the preferred embodiment of the fan 20 connects the trailing edges 46 of the blades 24 to one another and extends completely around the axis of the hub 22. As shown in FIG. 5, the ring 26 is positioned centrally between the tip and root edges 52,54 of the blades 24 and has a wedge shaped cross-section (the cross-section taken in a plane that includes the axis of the hub). The wedge shaped cross-section of the ring 26 is formed by axially opposite side surfaces 68 that taper toward each other as the as the ring extends radially inward. An outer surface 70 of the ring 26 lies flush with the edge of the trailing edges 46 of the blades 24.

In the preferred embodiment of the fan 20, only the ring 26 and hub 22 connect the blades 24 to one another, i.e. there is no backing attaching the blades. Thus, voids extend axially through the fan 20 between each adjacent pair of blades 24.

The fan 20 is assembled on the rotor shaft 38 of the motor 28 in a manner such that the tip edges 52 of the blades 24 are closer to the end shield 72 of the motor 28 than the root edges 54 of the blades. The cover 30 is then attached to the motor 28 where it covers the fan 20. The particular method used to secure the components together are not pertinent to this invention and any method known in the art for assembling components could be used.

The cover 30 is generally a cylindrical shell that is closed at one end by an imperforate flat disk shaped wall 74, and is configured such that the disk shaped wall 74 is positioned close to the root edges 54 of the blades 24 of the fan 20. The cover 30 also has a plurality of exhaust openings 76 circumferentially spaced about its cylindrical wall 78. When the cover 30 is attached to the motor 28, the exhaust openings 76 are axially aligned with the tip ends 46 of the blades 24 of the fan 20. To prevent fingers and other objects from contacting the blades 24 of the fan 20 during its operation, the cover 30 also has a cylindrical grill bar 80 that axially separates adjacent pairs of the exhaust openings 76.

As the fan 20 rotates with the rotor shaft 38 of the motor 28, the first sections of the blades radially discharge air by creating a pressure differential caused by centrifugal force. This pressure differential also acts to draw air from either of the axial sides of the fan 20, but the disk shaped wall 74 of the shroud 30 prevents air from being drawn into the fan from the side of the fan opposite the motor 28. Thus, air is drawn into the fan 20 through the vent openings 82 on the end shield 72 of the motor. While this is similar to the way conventional radial cooling fans operate, the configuration of the preferred embodiment of the fan 20 of the invention provides increased efficiency over prior art radial fans for any given fan size. This is because the first section 48 and the first portion 60 of the second section 50 of each blade 24 lie in the same plane and act as a radial-flow portion of each blade while the second portion 64 of the second section 50 acts as an axial-flow portion of the blade. In other words, because the first section and the first portion 60 of the second section 50 of each blade are in a plane that is parallel to the center axis of the hub 22, these parts of each blade 24 induce a radial pressure differential while the second portion 64 of the second section 50 induces an axial pressure differential. Thus, the second portions 64 of the second sections 50 of the blades 24 act partially as an axial-flow fan, thereby cutting into the air to draw air in from the side of the fan 20 facing the motor 28. The efficiency of the fan 20 is thereby increased as compared to conventional radial fans that draw air in purely by the pressure differential created as a result of the centrifugal force of the air near the trailing edges 54 of the blades 24.

Another advantage of the fan 20 lies in the presence and configuration of the ring 26. As air is expelled from the fan 20, it must pass through the exhaust openings 76 of the cover 30 and, normally, the grill bar 80 axially separating adjacent exhaust openings obstructs the flow of air being expelled from the fan. However, the ring 26 is positioned on the fan 20 where it is axially aligned with the grill bar 80 of the cover 30 when both are assembled on the motor 28. Additionally, the outermost surface 70 of the ring 26 has an axial width such that if the side surfaces 68 were continued outwardly, they would line up with the edges of the grill bar 80 of the cover 30. Thus, the tapered side surfaces 68 of the ring 26 act to axially separate and deflect the flow of the air being expelled from the fan 20 such that the air can pass more easily around the grill bar 80 of the cover 30.

An alternative embodiment of the fan 100 of the invention is shown in FIGS. 8–12 and comprises a central hub 102, a plurality of blades 104, and an annular ring 106. Like the fan 20 of the preferred embodiment, the fan 100 of the alternative embodiment is configured to cool an electric motor of the type having a rotor that rotates in only one direction and is preferably formed of a polymeric resin as a single monolithic part. However, the fan 100 of the alternative embodiment is preferably configured to be enclosed by the housing of a motor.

Like the hub 22 of the fan 20 of the preferred embodiment, the hub 102 of the fan 100 of the alternative embodiment is a generally cylindrical body having an outer peripheral surface 108 and a center bore or opening 110 that extends through the hub 102 along its axis. However, the opening 110 is cylindrical and has a plurality of axial slots 112 extending into an axial end of the hub 102 such that the fan 100 can be attached to a rotor shaft using a C-clip or spring clip placed around the end of the hub in which the slots are formed. Again, it should be understood that this method of attaching a fan to a shaft is known in the art and numerous other known methods of attaching fans to shafts could also be used.

Similar to the preferred embodiment, the blades 104 of the alternative embodiment of the fan 100 are evenly spaced circumferentially about the axis of the hub 22 and each of the blades 104 has a base end 114 that is secured to the hub 102, and each extends radially from the hub to an opposite trailing edge 116. Likewise, each of the blades 104 has a first radial section 118 extending radially inward from its trailing edge 116 and each has a second section 120 extending radially outward from its base end 114.

At any given radius from the axis of the hub 102, the first section 118 of each of the blades 104 has a cross-section that is generally rectangular, albeit the cross-section may be slightly non-rectangular to account for fabrication draft angle requirements. Each blade 104 as a tip edge 122 and root edge 124 and throughout the first section 118 of each blade 104, the chord-line 126 of the cross sections of the blade are oriented parallel to the axis of the hub 102.

Further like the preferred embodiment, the second section 120 of each of the blades 104 at any given radius from the axis of the hub 102, has a cross-section that has its chord-line 128 oriented at an angle relative to the axis of the hub 102 and, as the second section 120 of each of the blades 104 extends radially outward from the axis of the hub 102, the angle of the chord-line 128 relative to the axis of the hub 102 increases. The cross-section, at any given radial distance from the axis, throughout the second section 120 of each blade 104 consists of a first portion 130 and a second portion 134. The first portion 130 has opposite straight, generally parallel sides 132 that are oriented substantially parallel to the axis of the hub 102 and the second portion 134 has curved parallel sides 136, that intersect the first portion tangentially.

The first and second sections 118,120 of each of the blades 104 extend radially toward each other. However, unlike the preferred embodiment of the invention, the second portion 134 of the second section 120 of each blade 104 of the alternative embodiment extends axially forward of the first section 118 of each blade, i.e. in a direction away from the root edge 124 of each blade, as shown best in FIG. 12. The root edge 124 of each of the blades 104 also jogs axially forward as it extends from the first section 118 to the second section 120 of each of the blades.

Figure 12:
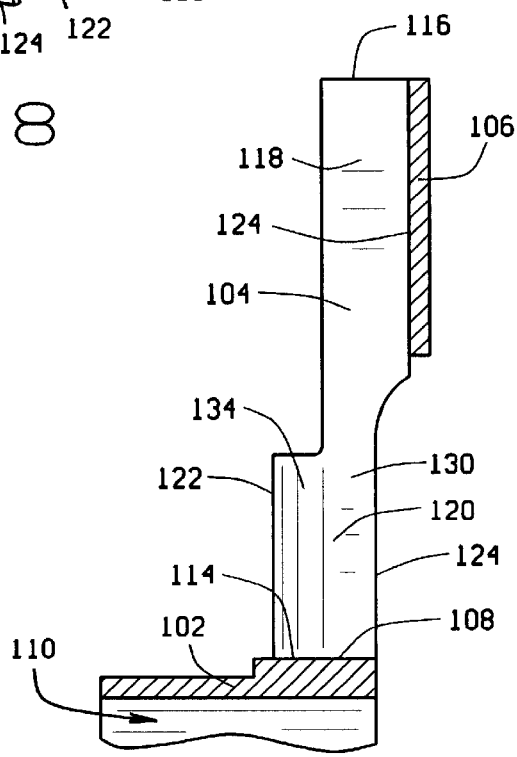
FIG. 12 is a partial cross-section of the fan of the alternative embodiment of the invention taken at the line 12—12 of FIG. 9.
Figure 9:
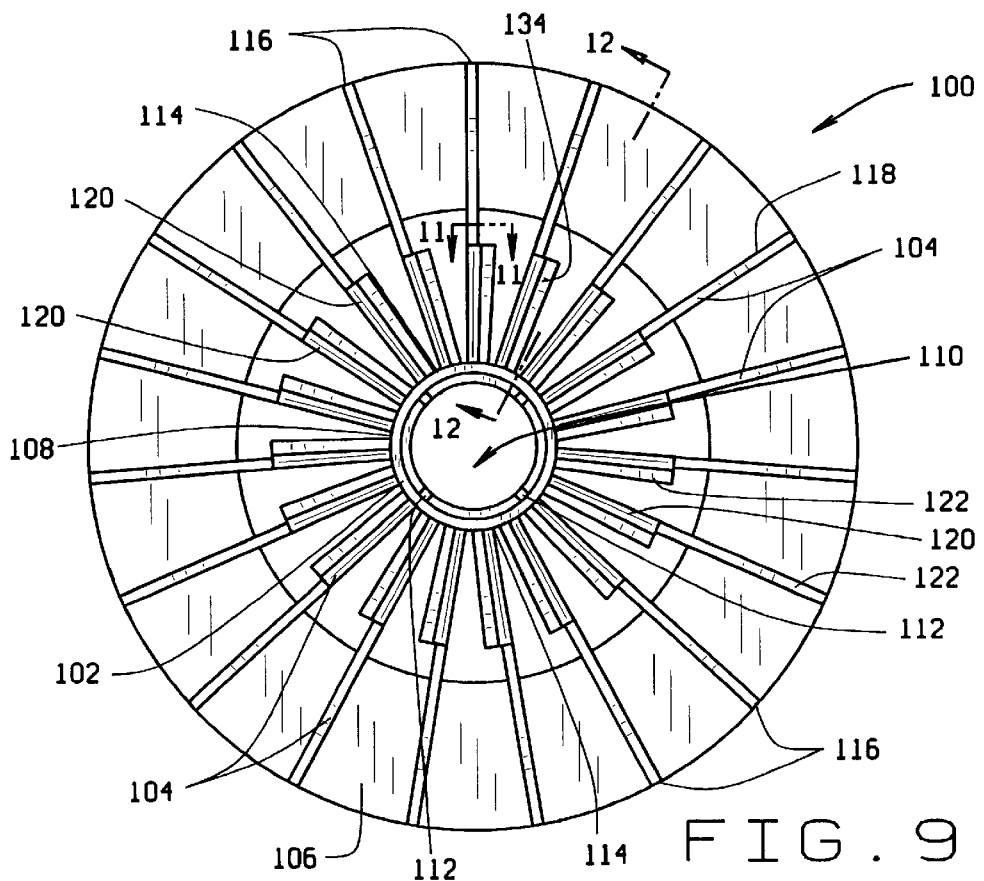
FIG. 9 is a plan view of the fan of the alternative embodiment of the invention as seen looking at the tip edges of the blades.
Figure 10:
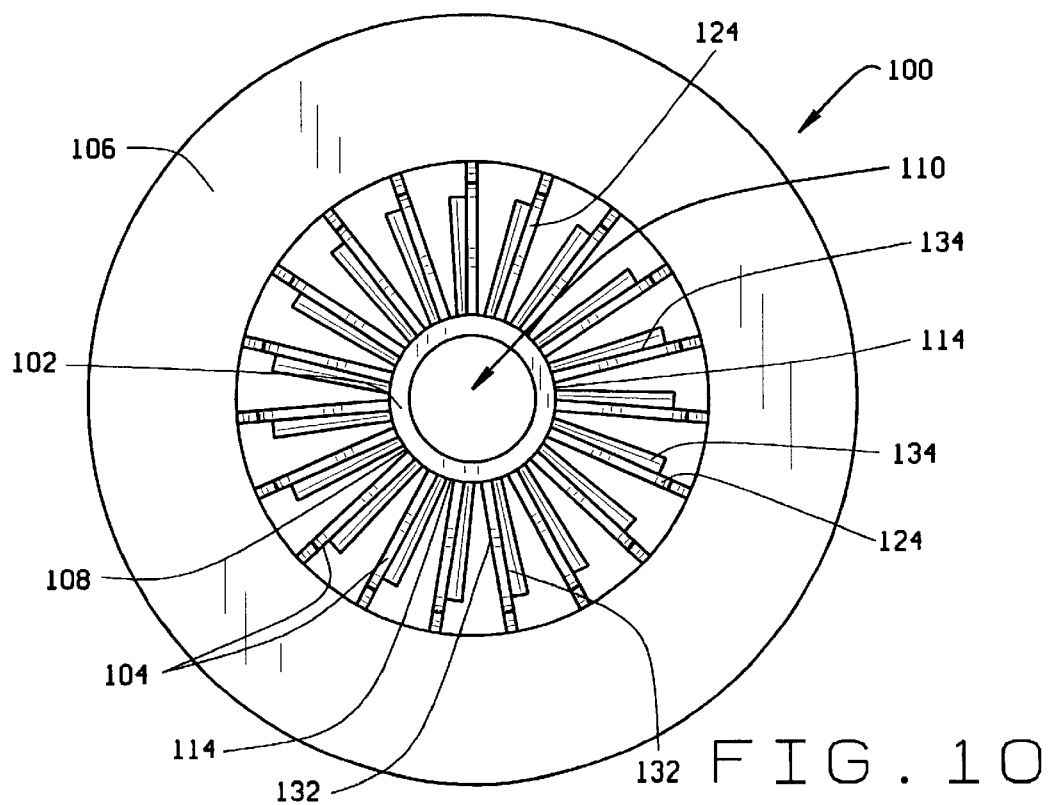
FIG. 10 is a plan view of the fan of the alternative embodiment of the invention as seen looking at the root edges of the blades.

The ring 106 of the fan 100 of the alternative embodiment extends completely around the axis of the hub 22 and connects the root edges 124 of the blades 104 to one another. As shown in FIG. 12, the ring 106 is disk shaped and extends radially inward along substantially the entire first section 118 of each of the blades 104. The ring 106 is essentially a partial backing attached to the blades 104 except that it does not extend in the radial region of the second sections 120 of blades. Thus, voids extend axially through the fan 100 between the second sections 120 of each adjacent pair of blades 104. As can be appreciated by one skilled in the art, the absence of the ring 106 in the radial region of the second section 120 of the blades 104 allows the fan 100 to be formed as a monolithic piece of polymeric material using a convention two-piece molding die.

The fan 100 of the alternative embodiment is assembled to a motor in a manner similar to the fan 20 of the preferred embodiment except that the fan 100 is configured to be positioned between an axial end of the stator (not shown) and an end shield of the motor, within the housing of the motor. Unlike the motor used with the fan of the preferred embodiment, exhaust openings aligned with the trailing edges 116 of the blades 104 extend directly through the housing of the motor used with the fan 100 of the alternative embodiment. An annular baffle or shroud (not shown) is preferably positioned between the first section 118 of the blades 104 of the fan 100 and the stator of the motor. The shroud is preferably shaped to substantially fill the axial space that exists between the stator of the motor and the first sections 118 of the blades 104 due to the second sections 120 of the blades of the fan 100 being axially forward of the first sections of the blades. The end shield has an imperforate disk shaped wall or alternatively has a cylindrical attachment that is positioned close to the ring 106 of the fan 100 or is attached to the center of the fan, and functions similar to the disk shaped wall 74 of the cover 30 used in conjunction with the fan 20 of the preferred embodiment. However, unlike a cover, the end shield has a centrally positioned bearing (not shown) for supporting the rotor shaft of the motor. The bearing protrudes axially into the motor from the wall of the end shield and is accommodated by the fact that the fan 100 is configured, as described above, such that root edge 124 along the second section 120 of each of the blades 104 is axially forward of the root edge along first section 118 of each blade.

In operation, the fan 100 of the alternative embodiment functions similar to the fan 20 of the preferred embodiment. The first section 118 and the first portion 130 of the second section 120 of each blade 104 lie in the same plane and act as a radial-flow portion of each blade while the second portion 134 of the second section acts as an axial-flow portion of the blade. The efficiency of the fan 100 is thereby increased as compared to conventional radial fans that draw air in purely by the pressure differential created as a result of the centrifugal force of the air near the trailing edges 116 of the blades 104.

While the present invention has been described by reference to a specific embodiment, it should be understood that modifications and variations of the invention may be constructed without departing from the scope of the invention defined by the following claims.

What is claimed is:

1. A fan comprising:

a center hub having a center axis and a peripheral surface, the center axis defining axial and radial directions;

a plurality of blades configured and adapted to draw air radially outward from the center axis by revolving with the center hub about the center axis, the plurality of blades each having a radially opposite base end and trailing edge, the base end of each of the blades being attached to the hub and each of the blades having an infinite number of cross-sections that each lie in a plane tangential to and radially spaced from the center axis, each of the blades having a first section extending radially inward from its trailing edge and a second section extending radially outward from its base end, cross-sections of the first section of each of the blades have chord-lines oriented parallel to the center axis, cross-sections of the second section of each of the blades have chord-lines oriented at an angle relative to the center axis, and the angle of the chord-lines of the second section cross-sections of each of the blades increases with increasing radial distance of the cross-section from the center axis; and, the fan has a plurality of voids between adjacent pairs of the blades that extend axially through the fan.

2. The fan of claim 1, wherein:

substantially all of the cross-sections of each of the blades have equal axial widths.

3. The fan of claim 1, wherein:

each of the cross-sections of the first section of each of the blades is symmetric about its chord-line.

4. The fan of claim 3 wherein:

each of the cross-sections of the first section of each of the blades is substantially rectangular.

5. The fan of claim 1, wherein:

the chord-line of the cross-section of each of the blades located at the base end of each of the blades is parallel to the center axis.

6. The fan of claim 1, wherein:

the first section of each of the blades connects with the second section thereof and the cross-sections of the first section and second section are different at their connection.

7. A fan comprising:

a center hub having a center axis and a peripheral surface, the center axis defining axial and radial directions;

a plurality of blades configured and adapted to draw air radially outward from the center axis by revolving with the center hub about the center axis, the plurality of blades each having a radially opposite base end and trailing edge, the base end of each of the blades being attached to the hub and each of the blades having an infinite number of cross-sections that each lie in a plane tangential to and radially spaced from the center axis, each of the blades having a first section extending radially inward from its trailing edge and a second section extending radially outward from its base end, cross sections of the first section of each of the blades have chord-lines oriented parallel to the center axis, cross-sections of the second section of each of the blades have chord-lines oriented at an angle relative to the center axis, and the angle of the chord-lines of the second section cross-sections of each of the blades increases with increasing radial distance of the cross-section from the center axis; and, the blades and the hub are one monolithic piece.

8. A fan comprising:

a center hub having a center axis and a peripheral surface, the center axis defining axial and radial directions;

a plurality of blades configured and adapted to draw air radially outward from the center axis by revolving with the center hub about the center axis, the plurality of blades each having a radially opposite base end and trailing edge, the base end of each of the blades being attached to the hub and each of the blades having an infinite number of cross-sections that each lie in a plane tangential to and radially spaced from the center axis, each of the blades having a first section extending radially inward from its trailing edge and a second section extending radially outward from its base end, cross-sections of the first section of each of the blades have chord-lines oriented parallel to the center axis, cross-sections of the second section of each of the blades have chord-lines oriented at an angle relative to the center axis, and the angle of the chord-lines of the second section cross-sections of each of the blades increases with increasing radial distance of the cross-section from the center axis; and, each of the cross-sections of the second section of each of the blades consist of first and second portions, the first portion having opposite straight parallel sides and the second portion having opposite straight parallel sides.

9. The fan of claim 8 wherein:

the opposite parallel sides of the first portion of each of the cross-sections of the second section of each of the blades are parallel to the center axis.

10. A fan comprising:

a center hub having a center axis and a peripheral surface, the center axis defining axial and radial directions;

a plurality of blades configured and adapted to draw air radially outward from the center axis by revolving with the center hub about the center axis, the plurality of blades each having a radially opposite base end and trailing edge, the base end of each of the blades being attached to the hub and each of the blades having an infinite number of cross-sections that each lie in a plane tangential to and radially spaced from the center axis, each of the blades having a first section extending radially inward from its trailing edge and a second section extending radially outward from its base end, cross-sections of the first section of each of the blades have chord-lines oriented parallel to the center axis, cross-sections of the second section of each of the blades have chord-lines oriented at an angle relative to the center axis, and the angle of the chord-lines of the second section cross-sections of each of the blades increases with increasing radial distance of the cross-section from the center axis; and, a ring extending around the hub interconnecting the trailing edges of the blades.

11. The fan of claim 10, wherein:

the ring has axially opposite sides that taper toward each other as the ring extends radially inward.

12. A fan comprising:

a center hub having a center axis and a peripheral surface, the center axis defining axial and radial directions;

a plurality of blades configured and adapted to draw air radially outward from the center axis by revolving with the center hub about the center axis, the plurality of blades each having a radially opposite base end and trailing edge, the base end of each of the blades being attached to the hub;

a ring extending around the hub that interconnects the trailing edges of the blades; and, each of the blades has an infinite number of cross-sections that each lie in a plane tangential to and radially spaced from the center axis and each of the blades has a first section extending radially inward from its trailing edge and a second section extending radially outward from its base end, each of the cross-sections of the first section of each of the blades have chord-lines oriented parallel to the center axis, cross-sections of the second section of each of the blades have chord-lines oriented at an angle to the center axis, and the angle of the chord-lines of the cross-sections of the second section of each of the blades increases with increasing radial spacing of the cross-section from the center axis, substantially all of the cross-sections of each of the blades having equal axial width.

13. The fan of claim 12, wherein:

the ring has axially opposite sides that taper toward each other as the ring extends radially inward.

14. A fan comprising:

a center hub having a center axis of rotation of the fan and a peripheral surface;

a plurality of blades radiating outwardly from the hub peripheral surface, each blade of the plurality of blades has a radial length with an opposite base end and trailing edge, the base ends of the blades are connected with the hub peripheral surface, at least some of the blades have radial-flow and axial-flow portions, the radial-flow portions of the blades are positioned in planes that contain the hub center axis and the axial-flow portions of the blades have at least portions that are positioned in planes that are oriented at an angle relative to the planes of the blade radial-flow portions, and the blade radial-flow portions extend from the base ends to the trailing edges of the blades; and, the fan is mounted to a shaft of a motor and the motor has a housing with at least one vent opening in the housing adjacent the axial-flow portions of the blades.

15. The fan of claim 14, wherein:

the fan has a plurality of voids between adjacent blades of the fan that extend axially through the fan.

16. The fan of claim 14, wherein:

a ring extends around and interconnects the trailing edges of the blades and the blades are only connected together by the hub and the ring.

17. The fan of claim 14, wherein:

each of the blade axial-flow portions has a radial length between a distal end of the blade axial-flow portion and the base end of the blade and the distal end of the blade axial-flow portion is positioned radially between the base end and the trailing edge of the blade.

18. The fan of claim 14, wherein:

each of the radial-flow portions of the blades are axially rearward of the axial-flow portions of the blades.

19. The fan of claim 18, wherein:

each of the blade axial-flow portions has a radial length between a distal end of the blade axial-flow portion and the base end of the blade and the distal end of the blade axial-flow portion is positioned radially between the base end and the trailing edge of the blade.

20. The fan of claim 1,9 wherein:

a portion of each of the blade first sections between the distal end of the blade axial-flow portion and the trailing edge of each of the blades extends axially rearward of all portions of the blade between the base end of the blade and the distal end of the blade axial-flow portion.

21. The fan of claim 19, further comprising:

a ring extending around the hub interconnecting the trailing edge of the first section of each of the blades, there being a plurality of voids that extend axially through the fan between the blade axial-flow portions of each adjacent pair of the blades.

22. The fan of claim 21, wherein:

the ring is positioned where it connects rearward most edges of the blades.

23. A fan comprising:

a center hub having a center axis of rotation of the fan and a peripheral surface;

a plurality of blades radiating outwardly from the hub peripheral surface, each blade of the plurality of blades has a radial length with an opposite base end and trailing edge, the base ends of the blades are connected with the hub peripheral surface, at least some of the blades have radial-flow and axial-flow portions, the radial-flow portions of the blades are positioned in planes that contain the hub center axis and the axial-flow portions of the blades have at least portions that are positioned in planes that are oriented at an angle relative to the planes of the blade radial-flow portions, and the blade radial-flow portions extend from the base ends to the trailing edges of the blades; and, the fan is mounted to a shaft of a motor and the motor has a cover that encloses the fan with at least one exhaust opening in the cover adjacent the trailing edges of the fan blades.

24. A fan having a center axis of rotation, the axis defining axial and radial directions, the fan comprising:

a plurality of blades configured and adapted to draw air radially outward from the axis by revolving about the center axis, the plurality of blades each having a radially opposite base end and trailing edge, the base end of each of the blades being radially closer to the center axis than the trailing edge of each of the blades and each of the blades having an infinite number of cross-sections that each lie in a plane tangential to and radially spaced from the center axis, each of the blades having a first section extending radially inward from its trailing edge and a second section extending radially outward from its base end, cross-sections of the first section of each of the blade have chord-lines oriented parallel to the center axis, and at least some cross-sections of the second section of each of the blades have chord-lines oriented at an angle relative to the center axis; and, the angles of the chord-lines of the second section cross-sections of each of the blades increases with increasing radial distance of the cross-section from the center axis.

25. The fan of claim 24, wherein:

each of the blade second sections includes a radial-flow portion and an axial-flow portion, the radial-flow portion is positioned in a plane that contains the center axis and the axial-flow portion has at least some part that is positioned in a plane oriented at an angle relative to the plane of the radial-flow portion.

26. The fan of claim 24, wherein:

the radial-flow portion and the first section of each blade are positioned in a common plane that contains the center axis.

27. A fan comprising:

a center hub having a center axis and a peripheral surface, the center axis defining axial and radial directions;

a plurality of blades configured and adapted to draw air radially outward from the center axis by revolving with the center hub about the center axis, the plurality of blades each having a radially opposite base end and trailing edge, the base end of each of the blades being attached to the hub and each of the blades having an infinite number of cross-sections that each lie in a plane tangential to and radially spaced from the center axis, each of the blades having a first section extending radially inward from its trailing edge and a second section extending radially outward from its base end, cross-sections of the first section of each of the blades have chord-lines oriented parallel to the center axis, cross-sections of the second section of each of the blades have chord-lines oriented at an angle relative to the center axis, and the angle of the chord-lines of the second section cross-sections of each of the blades increases with increasing radial distance of the cross-section from the center axis;

each of the cross-sections of the second section of each of the blades consists of first and second portions and the first portion extends axially forward of the cross-sections of the first section of the blade; and, a ring extending around the hub interconnecting the trailing edges of the first section of each of the blades, there being a plurality of voids that extend axially through the fan between the second sections of each adjacent pair of the blades.

28. The fan of claim 27, wherein:

the first portion of each of the cross-sections of the second section of each of the blades curves relative to the center axis and the second portion of each of the cross-sections of the second section of each of the blades is substantially parallel to the center axis.

29. The fan claim 27, wherein:

a portion of each of the cross-sections of the first section of each of the blades extends axially rearward of the cross-sections of the second section of the blade.

30. The fan of claim 27, wherein:

the ring is positioned where it connects rearward most edges of the blades.

* * * * *